(12) United States Patent
Harris

(10) Patent No.: US 8,572,009 B2
(45) Date of Patent: Oct. 29, 2013

(54) EVALUATING THE HEALTH STATUS OF A SYSTEM USING GROUPS OF VIBRATION DATA INCLUDING IMAGES OF THE VIBRATIONS OF THE SYSTEM

(75) Inventor: Patrick Neal Harris, Bonney Lake, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/136,972

(22) Filed: Aug. 16, 2011

(65) Prior Publication Data

US 2013/0046714 A1 Feb. 21, 2013

(51) Int. Cl.
G06F 19/00 (2011.01)
G06N 5/04 (2006.01)

(52) U.S. Cl.
USPC .......................................................... 706/12

(58) Field of Classification Search
USPC ............................... 706/12; 702/184; 711/108
See application file for complete search history.

(56) References Cited

U.S. PATENT DOCUMENTS

| | | |
|---|---|---|
| 6,581,049 B1 | 6/2003 | Aparicio, IV et al. |
| 7,016,886 B2 | 3/2006 | Cabana et al. |
| 7,027,953 B2 | 4/2006 | Klein |
| 7,062,483 B2 | 6/2006 | Ferrari et al. |
| 7,194,975 B2 | 3/2007 | Potter et al. |
| 7,325,201 B2 | 1/2008 | Ferrari et al. |
| 7,333,917 B2 | 2/2008 | Greis et al. |
| 7,428,528 B1 | 9/2008 | Ferrari et al. |
| 7,478,090 B2 | 1/2009 | Aparicio, IV et al. |
| 7,478,192 B2 | 1/2009 | Fleming et al. |
| 7,565,491 B2 | 7/2009 | Lemen et al. |
| 7,567,957 B2 | 7/2009 | Ferrari et al. |
| 7,574,416 B2 | 8/2009 | Aparicio, IV et al. |
| 7,581,702 B2 | 9/2009 | Olson et al. |
| 7,657,496 B2 | 2/2010 | Aparicio, IV |

(Continued)

FOREIGN PATENT DOCUMENTS

| | | |
|---|---|---|
| EP | 1455313 A1 | 9/2004 |
| EP | 2063399 A2 | 5/2009 |
| WO | 0218879 A1 | 3/2002 |
| WO | WO2011046684 A1 | 4/2011 |

OTHER PUBLICATIONS

Bonissone et al., "When will it break? A Hybrid Soft Computing Model to Predict Time-to-break Margins in Paper Machines", Proceedings of SPIE 47th Annual Meeting, International Symposium on Optical Science and Technology, Applications and Science of Neural Networks, Fuzzy Systems, and Evolutionary Computation V, Jul. 2002, pp. 53-64.

(Continued)

*Primary Examiner* — Jeffrey A Gaffin
*Assistant Examiner* — Ola Olude Afolabi
(74) *Attorney, Agent, or Firm* — Yee & Associates, P.C.

(57) ABSTRACT

A method and apparatus for determining a health of the system. Groups of vibration data are identified for the system. A group of vibration data in the groups of vibration data comprises data for vibrations of the system at different frequencies over time. The groups of vibration data for the system are stored in a number of associative memories in a computer system. The health of the system is identified based on the groups of vibration data in the number of associative memories. The groups of vibration data include images of the vibrations of the system.

18 Claims, 8 Drawing Sheets
(3 of 8 Drawing Sheet(s) Filed in Color)

(56) References Cited

U.S. PATENT DOCUMENTS

| | | | |
|---|---|---|---|
| 7,882,394 | B2 | 2/2011 | Hosek et al. |
| 7,904,195 | B2 | 3/2011 | Chao et al. |
| 7,912,823 | B2 | 3/2011 | Ferrari et al. |
| 8,019,752 | B2 | 9/2011 | Ferrari et al. |
| 8,160,981 | B2 | 4/2012 | Aparicio, IV |
| 2005/0038781 | A1 | 2/2005 | Ferrari et al. |
| 2005/0096873 | A1* | 5/2005 | Klein .......................... 702/184 |
| 2006/0005758 | A1 | 1/2006 | Potter et al. |
| 2006/0053104 | A1 | 3/2006 | Ferrari et al. |
| 2006/0095653 | A1* | 5/2006 | Fleming et al. ............... 711/108 |
| 2007/0033346 | A1 | 2/2007 | Lemen et al. |
| 2007/0038838 | A1 | 2/2007 | Greis et al. |
| 2007/0050104 | A1 | 3/2007 | Wallace et al. |
| 2007/0067678 | A1 | 3/2007 | Hosek et al. |
| 2007/0106658 | A1 | 5/2007 | Ferrari et al. |
| 2007/0299797 | A1 | 12/2007 | Aparicio, IV |
| 2008/0097945 | A1 | 4/2008 | Greis et al. |
| 2008/0133479 | A1 | 6/2008 | Zelevinsky et al. |
| 2008/0134100 | A1 | 6/2008 | Ferrari et al. |
| 2008/0177683 | A1 | 7/2008 | No et al. |
| 2008/0270328 | A1 | 10/2008 | Lafferty et al. |
| 2008/0312783 | A1 | 12/2008 | Mansouri et al. |
| 2009/0083207 | A1 | 3/2009 | Aparicio, IV |
| 2009/0198692 | A1 | 8/2009 | Aparicio, IV et al. |
| 2010/0205121 | A1 | 8/2010 | Quadracci et al. |
| 2010/0205192 | A1 | 8/2010 | Quadracci et al. |
| 2010/0205212 | A1 | 8/2010 | Quadracci et al. |
| 2011/0087387 | A1 | 4/2011 | Bakhsh et al. |

OTHER PUBLICATIONS

Bock et al., "On False Alarm Mitigation", 2006 IEEE Aerospace Conference, Jul. 2006, pp. 1-16.
Bock et al., "Ontogenetic Reasoning System for Autonomic Logistics", 2005 IEEE Aerospace Conference, Mar. 2005, pp. 3715-3722.
Bhangu et al., "Nonlinear Observers for Predicting State-of-Charge and State-of-Health of Lead-Acid Batteries for Hybrid-Electric Vehicles", IEEE Transactions on Vehicular Technology, vol. 54, No. 3, May 2005, pp. 783-794.
Beshears et al., "Designing for Health: a Methodology for Integrated Diagnostics/Prognostics", 2005 IEEE Autotestcon, Sep. 2005, pp. 90-95.
Amin et al., "Fuzzy Inference and Fusion for Health State Diagnosis of Hydraulic Pumps and Motors", Annual Meeting of the Fuzzy Information Processing Society, Jun. 2005, pp. 13-18.
Ginart et al., "Self-Healing from a PHM Perspective", 2006 IEEE Autotestcon, Sep. 2006, pp. 697-703.
Brown et al., "Electronic Prognostics—A Case Study Using Switched-Mode Power Supplies (SMPS)", IEEE Instrumentation & Measurement Magazine, Boeing Worldwide, Aug. 2007, pp. 20-26.
Brotherton et al., "Generic Integrated PHM/Controller System", 2005 IEEE Aerospace Conference, Mar. 2005, pp. 3427-3437.
Antolick et al., "Evaluation of Gear Condition Indicator Performance on Rotorcraft Fleet", RMCI, Inc., U.S. Army Aviation Engineering Directorate, Redstone Arsenal, AL, pp. 1-12.
CUC, "Vibration-Based Techniques for Damage Detection and Health Monitoring of Mechanical Systems", Partial Requirements for the Degree of Master of Science, Department of Mechanical Engineering, College of Engineering & Information Technology, University of South Carolina, 2002, 127 pp.
Grana et al., "Increasing the Robustness of Heteroassociative Morphological Memories for Practical Applications", 2002 Proceedings of ISMM, 2002, pp. 379-388.
Starzyk et al., "Spatio-Temporal Memories for Machine Learning: A Long-Term Memory Organization", IEEE Transactions on Neural Networks, vol. 20, Iss. 5, May 2009, pp. 768-780.
Ritter et al., "Morphological Associative Memories", IEEE Transactions on Neural Networks, vol. 9, Iss. 2, Mar. 1998, 31 pp.
NASA, Data Driven Prognostics References, 6 pp., accessed Dec. 13, 2011 http://ti.arc.nasa.gov/tech/dash/pcoe/data-driven-prognostics/bibliography/.

Schwabacher et al., "A Survey of Artificial Intelligence for Prognostics", NASA Ames Research Center, Moffett Field, CA, Sep. 2007, pp. 1-8.
NASA, Data Driven Prognostics Overview, 8 pp., accessed Dec. 13, 2011 http://ti.arc.nasa.gov/tech/dash/pcoe/data-driven-prognostics/.
PCT Search for application PCT/US2010/047742 dated Nov. 16, 2010.
Zhang, "Optimum Sensor Localization/Selection in a Diagnostic/Prognostic Architecture", Jan. 2005, dissertation George Institute of Technology, pp. 1-126.
Williams et al., "A Model-based Approach to Reactive Self-Configuring Systems", In Proceedings of AAAI-96, 1996, pp. 971-978.
Roemer et al., "An Overview of Selected Prognostic Technologies with Application to Engine Health Management", Proceedings of GT2006 ASME Turbo Expo 2006: Power for Land Sea and Air, May 2006, pp. 707-715.
Bonissone, "Knowledge and Time: a Framework for Soft Computing Applications in Prognostics and Health Management (PHM)", GE Global Research Technical Information Series, 2007GRC372, Apr. 2007, pp. 1-9.
Bonissone, "Knowledge and Time: Selected Case Studies in Prognostics and Health Management (PHM)", GE Global Research Technical Information Series, 2007GRC426, May 2007, pp. 1-9.
Bonissone et al., "Soft Computing Applications to Prognostics and Health Management (PHM): Leveraging Field Data and Domain Knowledge", 2007, GE Global Research, pp. 1-12.
Werbos, "Generalization of Backpropagation with Application to a Recurrent Gas Market Model", Neural Networks, vol. 1, Iss. 4, 1988, pp. 339-356.
Roemer et al., "Prognostics and Health Management Software for Gas Turbine Engine Bearings", Proceedings of GT2007 ASME Turbo Expo 2007: Power for Land Sea and Air, May 2007, pp. 1-8.
Xue et al., "An Instance-Based Method for Remaining Useful Life Estimationf or Aircraft Engines", Journal of Failure Analysis and Prevention, vol. 8, No. 2, Mar. 2008, pp. 199-206.
Watson et al., "Dynamic Modeling and Wear-Based Remaining Useful Life Prediction of High Power Clutch Systems", Tribology Transactions, vol. 48, No. 2, Apr. 2005, pp. 208-217, 2005.
Watson et al., "Improving the Maintenance process and Enabling Prognostics for Control Actuators Using CAHM Software", 2006 IEEE Aerospace Conference, Jul. 2006, pp. 1-8.
Volponi, "Data Fusion for Enhanced Aircraft Engine Prognostics and Health Management", NASA/CR 2005-214055, Dec. 2005, pp. 1-36.
Vichare et al., "Prognostics and Health Management of Electronics", IEEE Transactions on Components and Packaging Technologies, vol. 29, No. 1, Mar. 2006, pp. 1-8.
Tang et al., "Prognostics in the Control Loop", Association for the Advancement of Artificial Intelligence, Sep. 2007, pp. 128-135.
Studer et al., "On the Structure of a Neuro-Fuzzy System to Forecast Chaotic Time Series", International Symposium on Neuro-Fuzzy Systems, Aug. 1996. pp. 103-110.
Stone et al., "Neural Net Based Prognostics for an Industrial Semiconductor Fabrication System", IEEE International Conference on Systems, Man and Cybernetics, vol. 2, Oct. 2005, pp. 1512-1517.
Sharda, "Neural Networks for the MS/OR Analyst: An Application Bibliography", 1994, The Institute of Management Sciences, Interfaces, vol. 24, No. 2, Mar. 1994, pp. 116-130.
Shag et al., "Prognosis of remaining bearing life using neural networks", Proceedings of the Institute of Mechanical Engineers, Part I, Journal of Systems and Control Engineering, vol. 214, Iss. 3, 2000, pp. 217-231.
Schwabacher "A Survey of Data-Driven Prognostics", Proceedings of the American Institute of Aeronautics and Astronautics Infotech Aerospace Conference, Sep. 2005, pp. 1-5.
Saxena et al., "Integrated Diagnosis and Prognosis Architecture for Fleet Vehicles Using Dynamic Case-Based Reasoning", 2005 IEEE Autotestcon, Sep. 2005, pp. 96-102.
Sandborn, "A Data Mining Based Approach to Electronic Part Obsolescence Forecasting", IEEE Transactions on Components and Packaging Technologies, vol. 30, Iss. 3, Sep. 2007, pp. 397-401.
Saha et al., "An Integrated Approach to Battery Health Monitoring Using Bayesian Regression and State Estimation", 2007 IEEE Autotestcon, Sep. 2007, pp. 646-653.

(56) References Cited

OTHER PUBLICATIONS

Reichard, "Applications of Data Mining in Automated ISHM and Control for Complex Engineering Systems", Penn State University, pp. 1-23, retrieved Oct. 9, 2009 https://dashlink.arc.nasa.gov/static/dashlink/media/topic/Reichard_DataMining.ppt.pdf.
Przytula et al., "Reasoning Framework for Diagnosis and Prognosis", 2007 IEEE Aerospace Conference, Mar. 2007, pp. 1-10.
Pecheur et al., "From Livingstone to SMV, Formal Verification for Autonomous Spacecrafts", pp. 1-11, retrieved Oct. 9, 2009 http://www.cs.cmu.edu/~reids/papers/Model-Checking-IROS00.pdf.
Patterson-Hine et al., "A Review of Diagnostic techniques for ISHM Applications", pp. 1-22, retrieved Oct. 9, 2009 http://ti.arc.nasa.gov/m/pub/1094h/1094%20(APH).pdf.
Park et al., "Analysis of Space Shuttle Main Engine Data Using Beacon-Based Exception Analysis for Multi-Missions", IEEE Aerospace Conference Proceedings, vol. 6, Mar. 2002, pp. 6-2835-6-2844
Nanduri et al., "Circuit as a Sensor, a Practical Concept for Electronic Prognostics", 2007 IEEE Autotestcon, Sep. 2007, pp. 632-638.
Bi et al., "Neural Network Estimation of Low Airspeed for the V-22 Aircraft in Steady Flight", American Helicopter Society 59th Annual Forum, May 2003, pp. 1-11.
Muscettola et al., "Remote Agent: to boldly go where no AI system has gone before", Intelligence, vol. 103, Iss. 1-2, 1998, pp. 5-47.
Mackey et al., "BEAM: Technology for Autonomous Self-Analysis", IEEE Proceedings Aerospace Conference, vol. 6, Mar. 2001, pp. 2989-3001.
Luo et al., "Model-Based Fault Diagnosis Prognosis for Wheeled Mobile Robots: A Review", 31st Annual Conference of IEEE Industrial Electronics Society 2005, Nov. 2005, pp. 2267-2272.
Lee, "Measurement of machine performance degration using a neural network model", Elsevier Science Publishers, Computers in Industry, vol. 30, Iss. 3, Oct. 1996, pp. 193-209.
Lavretsky et al., "Health Monitoring of an Electro-Hydraulic System Using Ordered Neural Networks", Proceedings of the 2002 International Joint Conference on Neural Networks, 2000, vol. 3, Aug. 2002, pp. 2893-2898.
Khawaja et al., "Reasoning about Uncertainty in Prognosis: A Confidence prediction Neural Network Approach", Annual Meeting of the North American Fuzzy Information Processing Society, Jun. 2005, pp. 7-12.
Katipamula et al., "Methods for Fault Detection, Diagnostics, and Prognostics for Building Systems—A Review, Part I", HVAC&R Research, vol. 11, No. 1, Jan. 2005, pp. 1-24.
Katipamula et al., "Methods for Fault Detection, Diagnostics, and Prognostics for Building Systems—A Review, Part II", HVAC&R Research, vol. 11, No. 2, Apr. 2005, pp. 1-19.
Kalgren et al., "Self-Evolving, Advanced Test Stand Reasoning for Closed Loop Diagnostics", IEEE Autotestcon 2005, Sep. 2005, pp. 495-501.
Iyer et al., "Framework for Post-Prognostic Decision Support", 2006 IEEE Aerospace Conference, Jul. 2006, pp. 1-10.
Hess et al., "Challenges, Issues and Lessons Learned Chasing the "Big P": Real Predictive Prognostics Part 1", 2005 IEEE Aerospace Conference, Mar. 2005, pp. 3610-3619.
Goh et al., "A Review of Research in Manufacturing Prognostics", 2006 IEEE International Conference on Industrial Informatics, Aug. 2006, pp. 417-422.
Goebel, "Modeling Propagation of Gas Path Damage", 2007 IEEE Aerospace Conference, Mar. 2007, pp. 1-8.
Goebel et al., "Fusing Competing Prediction Algorithms for Prognostics", 2006 IEEE Aerospace Conference, Jul. 2006, pp. 1-10.
Goebel et al., "Prognostic Fusion for Uncertainty Reduction", 2007 AIAA Infotech@Aerospace Conference and Exhibit, May 2007, pp. 1-10.
Gebraeel et al., "Residual Lfie Predictions From Vibration-Based Degradation Signals: A Neural Network Approach", IEEE Transactions on Industrial Electronics, vol. 51, No. 3, Jun. 2004, pp. 694-700.
Gebraeel, "Sensory-Updted Residual Life Distributions for Components With Exponential Degradation Patterns", IEEE Transactions on Automation Science and Engineering, vol. 3, No. 4, Oct. 2006, pp. 382-393.
Clifton, "Condition Monitoring of Gas-Turbine Engines", Submitted to Department of Engineering Science, University of Oxford, St. Cross College, Dec. 2005, pp. 1-60.
Chinnam et al., "Online Reliability Estimation of Physical Systems Using Neural Networks and Wavelets", Smart Engineering system Design, vol. 4, Apr. 2002, pp. 253-264.
Byington et al., "Dynamic Signal Analysis and Neural Network Modeling for Life Prediction of Flight Control Actuators", American Helicopter Society 60th Annual Forum, vol. 1, Jun. 2004, pp. 1-10.
Brown et al., "Electronic Prognotics—A Case Study Using global Positioning system (GPS)," 2005 IEEE Autotestcon, Sep. 2005, pp. 833-839.
Safa-Bakhsh et al., "Platform Health Monitoring System," U.S. Appl. No. 13/655,169, filed Oct. 18, 2012, 76 pages.
Office Action, dated Dec. 1, 2011, regarding U.S. Appl. No. 12/577,549, 24 pages.
Final Office Action, dated Apr. 20, 2012, regarding U.S. Appl. No. 12/577,549, 13 pages.

* cited by examiner

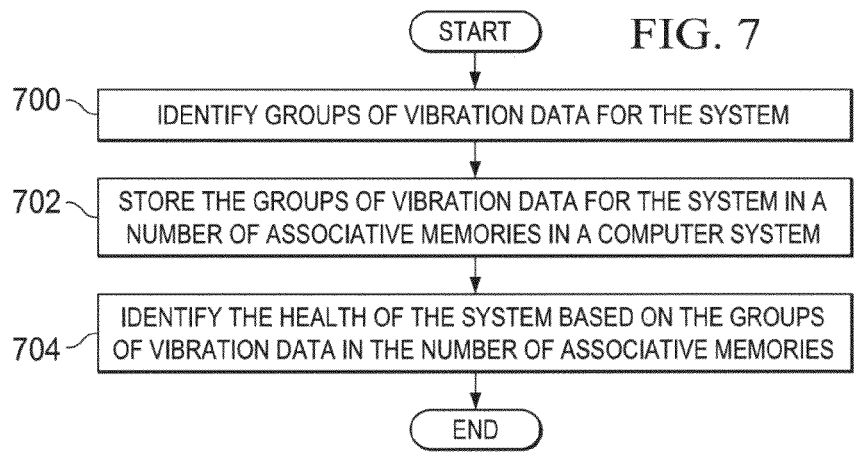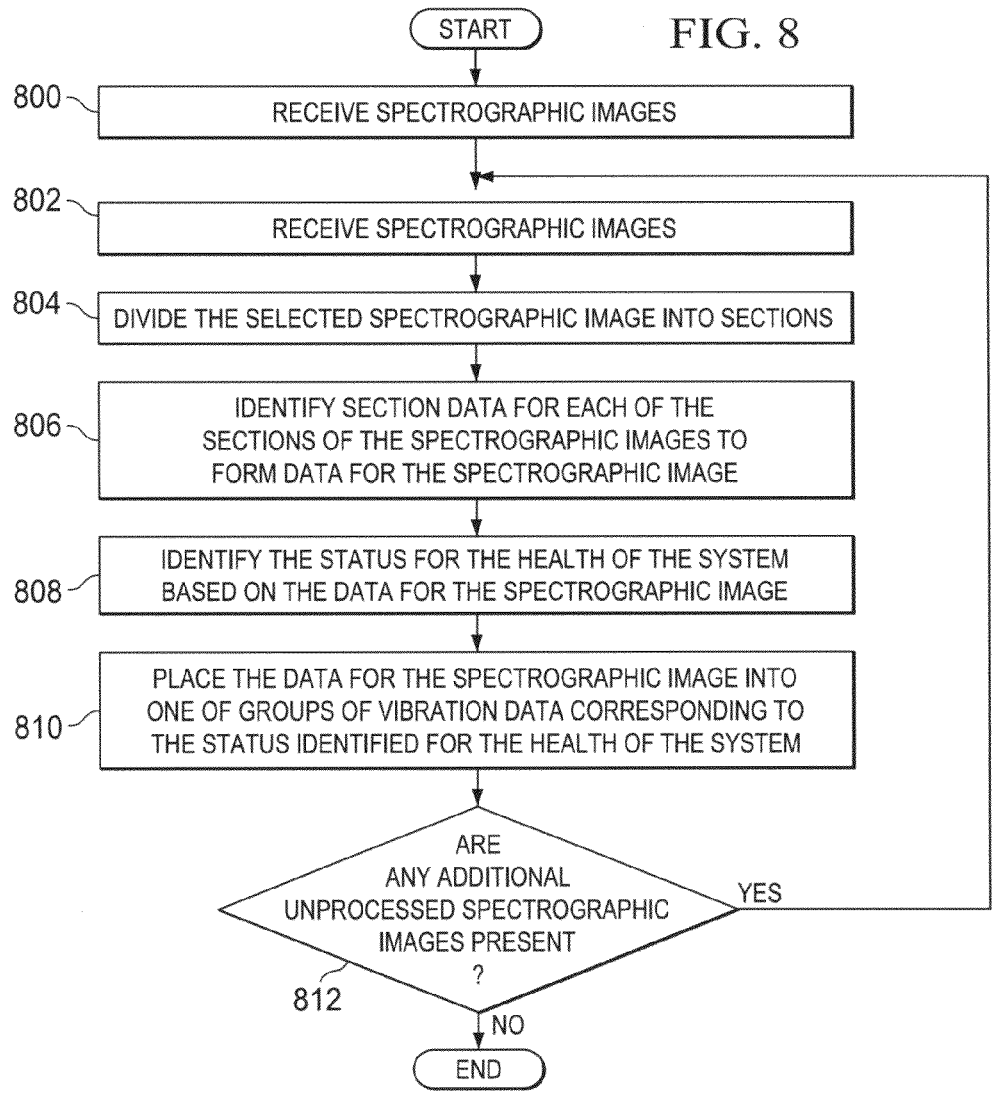

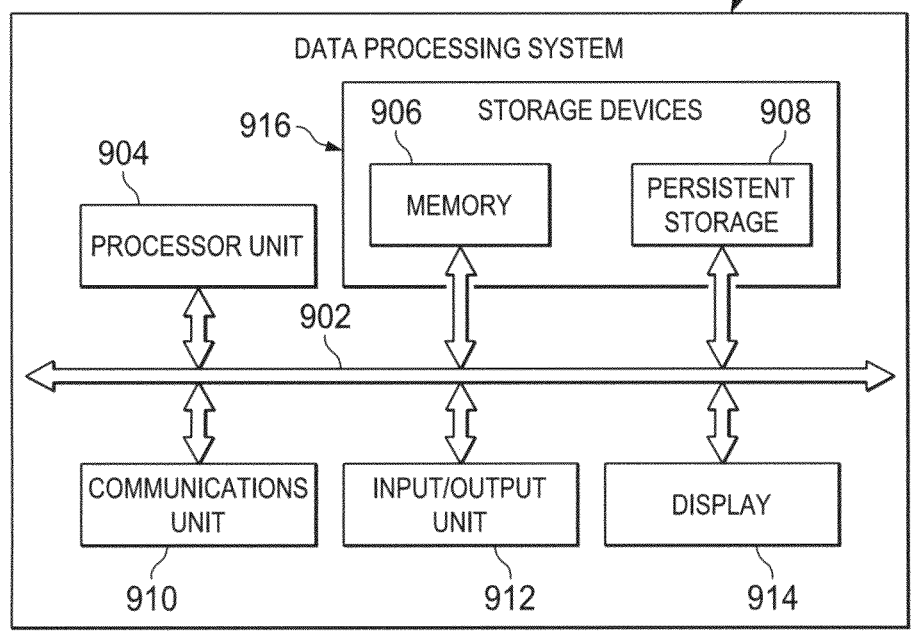
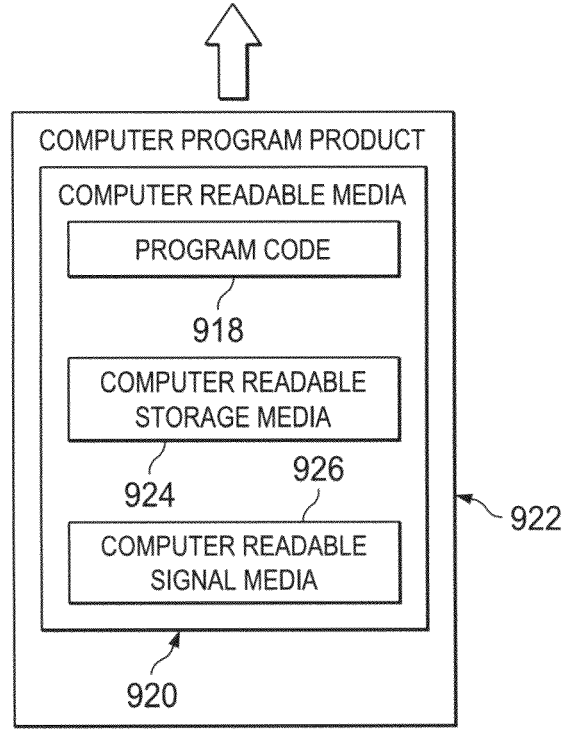
FIG. 9

EVALUATING THE HEALTH STATUS OF A SYSTEM USING GROUPS OF VIBRATION DATA INCLUDING IMAGES OF THE VIBRATIONS OF THE SYSTEM

BACKGROUND INFORMATION

1. Field

The present disclosure relates to a method and apparatus for evaluating the health of complex systems and, in particular, to using spectrographic images to evaluate the health of complex mechanical systems that are subject to vibration.

2. Background

Health monitoring systems may be used for monitoring the health of various types of systems. Monitoring the health of a system may include, for example, recording sensor data that has been generated for the system, analyzing the sensor data, assessing the health of the system based on the analysis of the sensor data, managing the health of the system based on the assessment, and/or other suitable operations.

As used herein, the term "health" of a given system is defined as an assessment of the operational parameters of the given system with respect to either an ideal system having similar characteristics or a standard system having similar characteristics. A system may be "healthy" when the given system operates within one or more specified tolerances of the operational parameters of the ideal or standard system. For example, if a given automobile engine is operating within one or more specified tolerances of the operational parameters of an ideal or standardized automobile engine having similar characteristics, then the given automobile engine may be characterized as "healthy".

The different types of systems that may be monitored may include, for example, without limitation, manufacturing systems, control systems, communication systems, satellite systems, propulsion systems, vehicles, and/or other suitable types of systems. For example, health monitoring systems may be used in evaluating and managing the health of vehicles, such as automobiles, aircraft, spacecraft, rotorcraft, watercraft, and other types of vehicles.

As one illustrative example, an integrated vehicle health management (IVHM) system may be used to evaluate and manage the health of a rotorcraft. A rotorcraft may be, for example, a helicopter. However, other types of rotorcraft exist. Rotorcraft may include multitudinous integrated moving components that are designed to operate together for a common purpose. For example, the nose gearbox assembly that connects the engine transmission of the helicopter transfers energy to a vast number of moving and interacting gears, shafts, and possibly other components. In some cases, it may be advantageous to monitor the health of this gear assembly, of other components of the helicopter, or possibly of the rotorcraft as a whole.

Currently-used integrated vehicle health management practices for managing the health of a rotorcraft may include, for example, processing sensor data generated about the rotorcraft, performing statistical analysis of the sensor data, and/or performing other operations. Further, these practices may require that the operator performing the analysis for the rotorcraft have an understanding of a physics-based model of the rotorcraft and/or the statistical approach used to analyze the sensor data.

Oftentimes, when evaluating the health of a vehicle, such as a rotorcraft, a health monitoring system may generate indications when components in the vehicle are identified as having an undesired health status. However, with currently-available health monitoring systems, indications are oftentimes generated when the components do not actually have the undesired health status. These indications may be referred to as "false positives".

For example, a health monitoring system may generate an indication that a part on a rotorcraft needs further maintenance. However, this part may not actually need any further maintenance. In other words, the health monitoring system may generate a false positive for the part. False positives may increase the cost, time, and/or effort needed in performing maintenance for the rotorcraft. For example, inspections, repairs, replacements, and/or other operations may be performed for the part when these operations are not actually needed.

Therefore, it would be advantageous to have a method and apparatus that takes into account at least some of the issues discussed above, as well as possibly other issues.

SUMMARY

In one advantageous embodiment, a method is provided for determining the health of a system. Groups of vibration data are identified for the system. A group of vibration data in the groups of vibration data comprises data for vibrations of the system at different frequencies over time. The groups of vibration data for the system are stored in a number of associative memories in a computer system. The health of the system is identified based on the groups of vibration data in the number of associative memories.

In another advantageous embodiment, a method is provided for determining a health of a system. Spectrographic images of vibrations of the system are stored in a number of associative memories in a computer system. The health of the system is identified based on the spectrographic images stored in the number of associative memories.

In yet another advantageous embodiment, a health monitoring system comprises a number of associative memories and a health analyzer. The number of associative memories is configured to store groups of vibration data for a system. A group of vibration data in the groups of vibration data comprises data for vibrations of the system at different frequencies over time. A health analyzer is configured to identify the health of the system based on the groups of vibration data in the number of associative memories.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 7 is an illustration of a flowchart of a process for determining the health of a system in accordance with an advantageous embodiment;

FIG. 8 is an illustration of a flowchart of a process for determining the health of a system in accordance with an advantageous embodiment; and FIG. 9 is an illustration of a data processing system in accordance with an advantageous embodiment.

DETAILED DESCRIPTION

Figure 1:
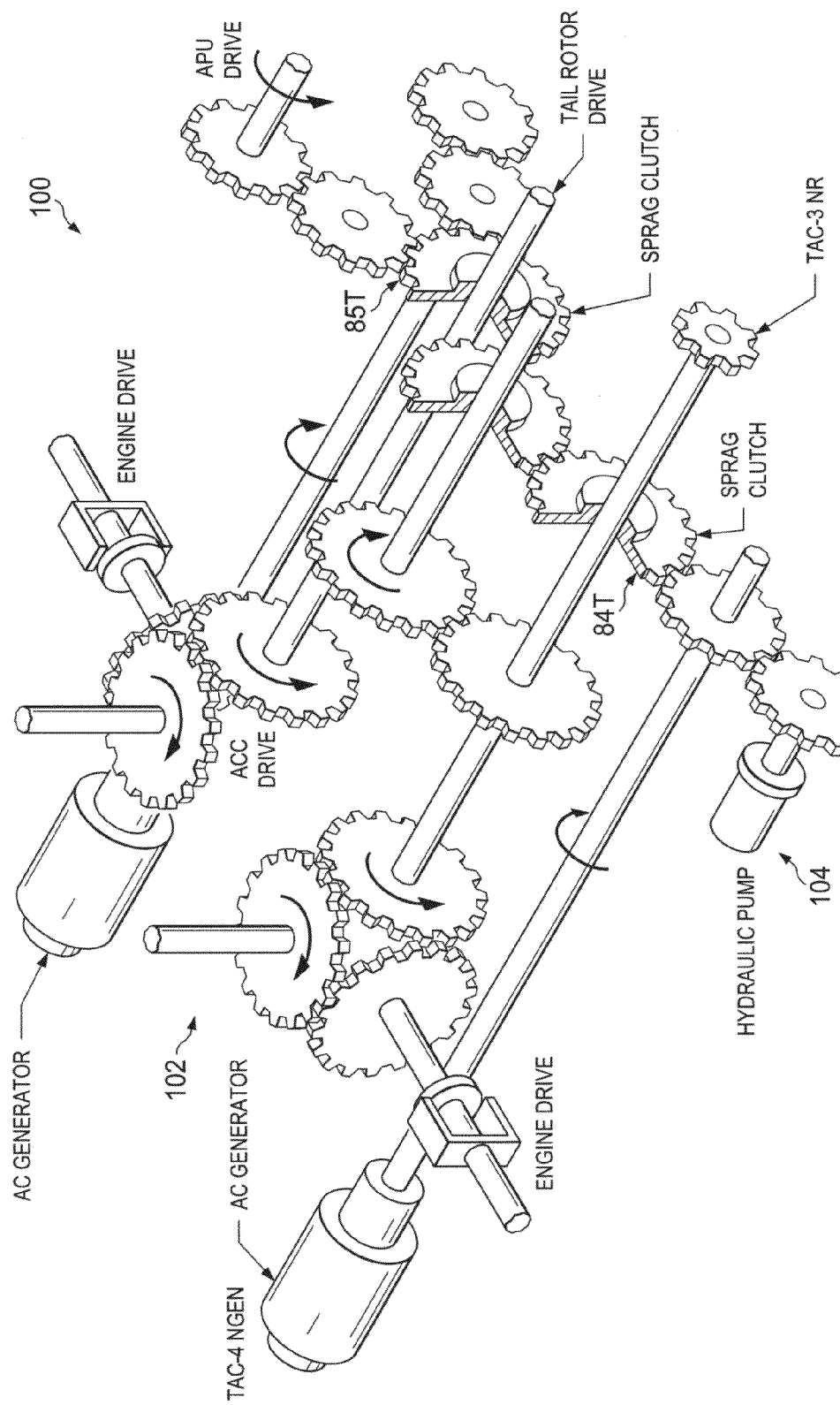
FIG. 1 is an illustration of a drive system for a helicopter in accordance with an advantageous embodiment.

The different advantageous embodiments recognize and take into account a number of different considerations. For example, the different advantageous embodiments recognize and take into account that currently-available health monitoring systems may rely on a specialist or analyst using conditional indicators to determine the health of a system. As one example, these conditional indicators may be used to classify the health of the system. For example, the health of a system may be classified as falling within one or more categories describing the health of the system.

Typically, with currently-available health monitoring systems, a specialist may be required to classify the health of the system based on the conditional indicators and any analysis of sensor data that has been performed. The specialist may be required to have an extensive understanding of the type of analysis performed to evaluate the health of a system, the type of sensor data used in the analysis, any models describing the system, and/or other suitable information about the system to classify the health of the system using the conditional indicators.

The different advantageous embodiments recognize and take into account that evaluating the health of a system based on input from a specialist may take more time and/or effort than desired. Further, the different advantageous embodiments recognize and take into account that human error may cause a greater number of false positives to be generated than desired in the evaluation of the health of the system. As a result, the different advantageous embodiments recognize and take into account that it may be desirable to have a health monitoring system that is capable of classifying a health status of a system without requiring a specialist to make this classification.

Additionally, the different advantageous embodiments recognize and take into account that with currently-available health monitoring systems, sensor data generated for a system may be modeled and/or simplified prior to performing analysis of the sensor data. This modeling and/or simplification may be performed to reduce the amount of data for analysis and thereby reduce the amount of processing power and/or resources needed for performing the analysis.

For example, each image in a series of images generated for the system may be reduced to a single representative value for the image. The different advantageous embodiments recognize and take into account that this reduction of data for analysis may lead to an assessment of the health of the system that is less accurate than desired. For example, a greater number of false positives than desired may be generated.

The complexity of a system may be a contributing factor to the amount of time, effort, and/or processing power and resources needed to evaluate the health of a system. The different advantageous embodiments recognize and take into account that the complexity of a system may increase as the number of components in the system increases. Further, the different advantageous embodiments recognize and take into account that as the complexity of the system increases, the amount of time, effort, and/or processing power and resources needed to evaluate the health of the system also may increase in an undesired manner.

As a result, the different advantageous embodiments recognize and take into account that it may be desirable to have a health monitoring system that is capable of evaluating the health of a complex system, such as a complex assembly of parts, with a greater accuracy, while simultaneously using less time, effort, processing power, and/or resources as compared to currently-available health monitoring systems. One illustrative example of a complex system is described in FIG. 1 below.

With reference now to the figures and, in particular, with reference to FIG. 1, an illustration of a drive system for a helicopter is depicted in accordance with an advantageous embodiment. In this illustrative example, drive system 100 is a helicopter drive system. Drive system 100 may be a complex system comprising components 102. Gearbox 104 may be an example of one of components 102.

The different advantageous embodiments recognize and take into account that monitoring the health of drive system 100 may be more time-consuming and require more time, effort, processing power, and/or resources than desired using currently-available health monitoring systems. Further, the different advantageous embodiments recognize and take into account that with a complex system, such as drive system 100, currently-available health monitoring systems may be unable to process and store all of the sensor data that may be generated for the system.

For example, a conventional health monitoring system, such as a health and usage monitoring system (HUMS), may be used to monitor the health of drive system 100. This health and usage monitoring system may be configured to process and store vibration data measured over time. This vibration data is oftentimes transformed into the frequency domain. The accompanying frequency domain spectral density response may be in the form of spectrographic images generated for drive system 100. In particular, this health and usage monitoring system may reduce the frequency domain spectral density response into a single value for analysis and storage for future use. As a result, evaluations of the health of drive system 100 may be performed using only a subset of the total amount of vibration data generated for drive system 100.

The different advantageous embodiments recognize and take into account that with this type of health monitoring system, the identification of a health status for drive system 100 and/or for one or more of components 102 of drive system 100 made using the subset of the total amount of vibration data may be less accurate than desired. In particular, false positives may be generated that may increase the cost, time, and/or effort needed for managing the health of drive system 100 more than desired.

The different advantageous embodiments recognize and take into account that it may be desirable to have a health monitoring system that is configured to store and process all of the vibration data generated for drive system 100. Further, the different advantageous embodiments recognize and take into account that it may be desirable to have a health monitoring system that is configured to make determinations about the health status of drive system 100 and components 102 of drive system 100 without needing to rely on the input of a specialist to classify the health status.

Thus, the different advantageous embodiments provide a method and apparatus for determining the health of a system. In particular, the different advantageous embodiments provide a health monitoring system that may be capable of evaluating the health of a complex system, such as a complex assembly of parts, with a greater accuracy and using less time, effort, and/or processing power and resources as compared to currently-available health monitoring systems.

In one advantageous embodiment, groups of vibration data are identified for the system. A group of vibration data in the groups of vibration data comprises data for vibrations for the system at different frequencies over time. The groups of vibration data for the system are stored in a number of associative memories in a computer system. The health of the system is identified based on the groups of vibration data in the number of associative memories. Using associative memories may reduce the amount of time and/or effort needed to identify the health of the system and may reduce the number of false positives generated when evaluating the health of the system.

Figure 2:
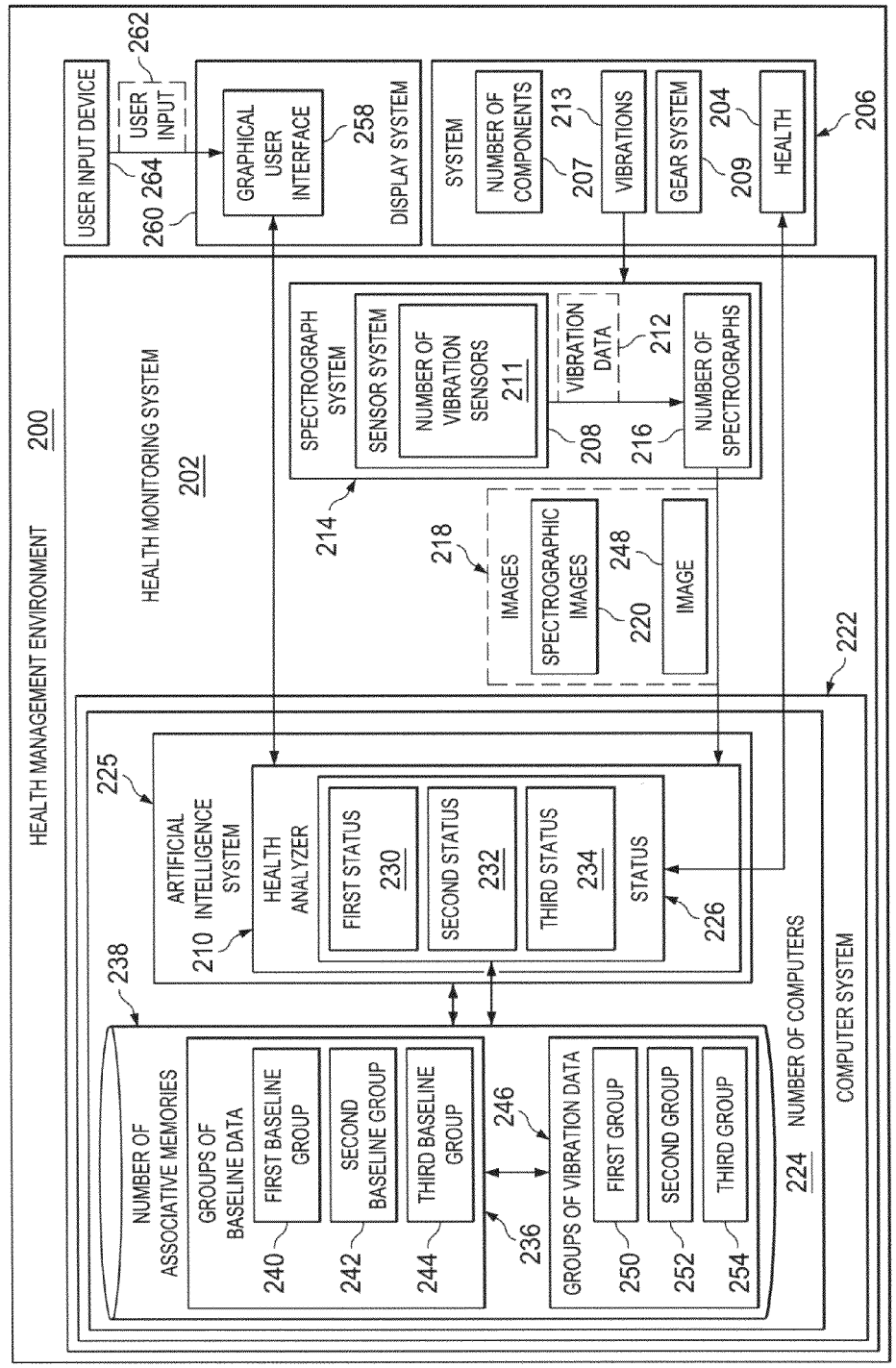
FIG. 2 is an illustration of a health management environment in the form of a block diagram in accordance with an advantageous embodiment.

With reference now to FIG. 2, an illustration of a health management environment in the form of a block diagram is depicted in accordance with an advantageous embodiment. In these illustrative examples, health management environment 200 may be an example of an environment in which the different advantageous embodiments may be implemented. For example, health monitoring system 202 may be used to monitor health 204 of system 206 in health management environment 200.

In these illustrative examples, system 206 may take a number of different forms. For example, system 206 may be an assembly. System 206 may be selected from one of, for example, without limitation, an aircraft, an unmanned aerial vehicle, an autonomous vehicle, a gearbox, an engine, an engine housing, a control surface, a landing gear system, a propulsion system, a fuselage, a rotorcraft, a spacecraft, a ship, a train, an automobile, a vehicle, a drive system, a brake system, a wing, a wind turbine, a dam, a computer numerical controlled machine, a manufacturing system, a building, a bridge, and/or some other suitable type of system.

System 206 may comprise number of components 207. For example, system 206 may be an assembly of components. Number of components 207 may include, for example, an actuator, a rod, a member, a beam, a fastener, a bolt, a nut, a gear, a housing, a pin, a drill bit, a handle, a door, a window, a skin panel, a composite structure, a wheel, a propeller, and/or other suitable types of components.

As one illustrative example, system 206 may take the form of gear system 209. Gear system 209 may be, for example, a gearbox for a helicopter drive system, such as gearbox 104 for drive system 100 in FIG. 1. Gear system 209 may comprise number of components 207 in the form of gears, shafts, and other suitable types of components for gear system 209.

As depicted, health monitoring system 202 may include sensor system 208 and health analyzer 210. Sensor system 208 may include number of vibration sensors 211. As used herein, a number of items may mean one or more items. For example, number of vibration sensors 211 may be one or more vibration sensors.

In these illustrative examples, sensor system 208 may be configured to generate vibration data 212. In particular, sensor system 208 measures vibrations 213 of system 206 over time to generate vibration data 212. Vibration data 212 comprises data for the different frequencies of vibrations 213 of system 206 measured over time. Vibrations 213 may be measured by sensor system 208 during operation of system 206 to test and evaluate health 204 of system 206.

In these illustrative examples, number of vibration sensors 211 may be placed in locations with respect to system 206 such that vibrations 213 may be measured. For example, number of vibration sensors 211 may be attached to one or more of number of components 207 in system 206. Additionally, more than one of number of vibration sensors 211 may be attached to a particular component in number of components 207. For example, a first sensor may be attached to a component to monitor the input side of the energy transfer of vibrations into the component, while a second sensor is attached to the component to monitor the output side of the energy transfer.

In these depicted examples, vibration data 212 generated by number of vibration sensors 211 may be time series vibration data. Time series vibration data may comprise measurements of vibrations 213 taken over a period of time, such as, for example, without limitation, an hour, three hours, one day, two days, a week, or some other suitable period of time. Vibration data 212 may be generated continuously and/or periodically during this period of time.

As depicted, sensor system 208 may be part of spectrograph system 214. Spectrograph system 214 may also include number of spectrographs 216. Number of spectrographs 216 may be configured to receive vibration data 212 in the form of a number of electrical signals from number of vibration sensors 211. Further, vibration data 212 may be received as time series vibration data in the time domain. When received in this form, number of spectrographs 216 may be configured to convert vibration data 212 into a frequency domain representation of the time domain. In other illustrative examples, vibration data 212 may be received by number of spectrographs 216 in the frequency domain.

Number of spectrographs 216 is configured to generate images 218 using vibration data 212 in the frequency domain. In other words, number of spectrographs 216 may be configured to represent vibration data 212 in the form of images 218. In these illustrative examples, images 218 may be spectrographic images 220.

A spectrographic image may also be referred to as a spectrogram. As used herein, a spectrographic image may be a time-varying spectral representation in the form of an image that shows how the spectral density of a signal varies with time. Further, a spectrographic image may represent information about vibrations 213 measured by number of vibration sensors 211 in the form of colors, color intensities, and color distribution.

In these illustrative examples, spectrograph system 214 may be configured to send images 218 to health analyzer 210 for processing. Health analyzer 210 may be in communication with spectrograph system 214. In these illustrative examples, health analyzer 210 may be implemented using hardware, software, or a combination of both.

In one illustrative example, health analyzer 210 may be implemented in computer system 222. Computer system 222 may take the form of number of computers 224. Any of number of computers 224 may take the form of data processing system 900 in FIG. 9. When more than one computer is present in number of computers 224, these computers may be in communication. Depending on the implementation, number of computers 224 may be located in the same location or one or more of number of computers 224 may be located in different locations.

In some illustrative examples, computer system 222 may take the form of artificial intelligence system 225. Artificial intelligence system 225 may be any computer system configured to perform problem-solving, learning, adapting, recognizing, classifying, self-improvement, reasoning, and/or other suitable operations that would typically be performed using user input and/or by human intelligence. Artificial intelligence system 225 may comprise at least one of, for example, without limitation, a cognitive simulation, a knowledge-based system, a neural network, a fuzzy logic system, a cognitive model, and some other suitable type of artificial intelligence.

In these illustrative examples, health analyzer 210 may receive images 218 from spectrograph system 214 and analyze images 218. In particular, health analyzer 210 may be configured to identify status 226 for health 204 of system 206 for each of images 218.

In one illustrative example, health analyzer 210 may be configured to identify status 226 for health 204 of system 206 as one of first status 230, second status 232, or third status 234. First status 230 may represent, for example, a "preferred" status for health 204 of system 206. Second status 232 may represent, for example, a "non-preferred" status for health 204 of system 206. Further, third status 234 may represent, for example, a "maintenance" status for health 204 of system 206.

In particular, health analyzer 210 may identify status 226 for health 204 of system 206 from images 218 based on training of health analyzer 210 using groups of baseline data 236. Groups of baseline data 236 may be stored in number of associative memories 238.

As used herein, an associative memory is a type of memory having an organization in which data stored in the memory may be accessed based on both direct and indirect relationships among different data stored in the associative memory. As indicated above, an associative memory may comprise data and associations between the data. These associations also may be referred to as relationships between the data.

Further, an associative memory may also be described as a content-addressable structure that maps a set of input patterns to a set of output patterns. A content-addressable structure is a memory organization in which data is accessed by content as opposed to an address for the data in the memory.

In these depicted examples, number of associative memories 238 may comprise a number of hetero-associative memories. In particular, with a hetero-associative memory, the output pattern retrieved based on the input pattern may be different from the input pattern in at least one of content, type, and/or format. A hetero-associative memory is different from an auto-associative memory in that an auto-associative memory retrieves a previously-stored pattern that most closely resembles the input pattern.

In these illustrative examples, groups of baseline data 236 may be data identified using groups of spectrographic images from which status 226 for health 204 of system 206 has been identified. For example, each of groups of baseline data 236 may correspond to one of first status 230, second status 232, or third status 234.

In particular, groups of baseline data 236 may include first baseline group 240, second baseline group 242, and third baseline group 244. First baseline group 240 may include data identified using images from which first status 230 for health 204 was identified for system 206. Second baseline group 242 may include data identified using images from which second status 232 for health 204 was identified for system 206. Further, third baseline group 244 may include data identified using images from which third status 234 for health 204 was identified for system 206.

The data included in each group in groups of baseline data 236 may include various pieces of information. For example, without limitation, the data in a particular group of groups of baseline data 236 may include a group of baseline vibration data identified from images from which status 226 for health 204 of system 206 was identified. The group of baseline vibration data may include, for example, at least one of a particular color distribution and a pattern of colors for the status of health corresponding to the particular group in groups of baseline data 236.

Further, the data included in each group in groups of baseline data 236 may also include, without limitation, a set of operations to be performed based on the corresponding status of health, an identification of further tests that may need to be performed based on the corresponding status of health, an expected time to a change from the corresponding status of health to a less preferred status of health, and/or other suitable information. As used herein, a set of items, such as a set of operations, may mean zero or more operations. For example, the set of operations may be a null or empty set.

Number of associative memories 238 may be configured to form relationships between groups of baseline data 236 and/or relationships between a particular status and each of groups of baseline data 236. As one illustrative example, the baseline data in groups of baseline data 236 may be related such that multiple pieces of related information may be retrieved from number of associative memories 238 with only one or two pieces of input information. For example, health analyzer 210 may be able to retrieve multiple pieces of related information from number of associative memories 238 using any portion of the data identified from one of images 218.

Health analyzer 210 may receive groups of baseline data 236 from any number of sources. In one illustrative example, without limitation, groups of baseline data 236 may be obtained from a storage system storing previously-analyzed spectrographic images and then placed into number of associative memories 238.

In another illustrative example, a specialist or some other suitable operator may determine in which of groups of baseline data 236 the data identified from the spectrographic images belongs. In yet other illustrative examples, health analyzer 210 may use a policy specifying a number of rules, criteria, and/or requirements for grouping the data identified from spectrographic images into groups of baseline data 236.

Further, health analyzer 210 may train itself using groups of baseline data 236 in number of associative memories 238 to identify status 226 for health 204 of system 206 from images 218. Based on this training, health analyzer 210 may place data identified from images 218 received from spectrograph system 214 during testing of system 206 into one of groups of vibration data 246.

In these illustrative examples, each group of data in groups of vibration data 246 may comprise data for vibrations 213 of system 206 at different frequencies over time. In particular, each group of data in groups of vibration data 246 may include data identified from images 218. This data may include the image itself.

Further, in these illustrative examples, groups of vibration data 246 may correspond to groups of baseline data 236. For example, groups of vibration data 246 may include first group 250, second group 252, and third group 254 that correspond to first baseline group 240, second baseline group 242, and third baseline group 244, respectively. In this manner, groups of vibration data 246 may correspond to first status 230, second status 232, and third status 234, respectively.

Image 248 may be an example of one of images 218. Health analyzer 210 may place data identified from image 248 into one of first group 250, second group 252, and third group 254 based on whether this data indicates first status 230, second status 232, or third status 234, respectively, for health 204 of system 206 based on the training of health analyzer 210 using groups of baseline data 236.

In these illustrative examples, health analyzer 210 may place groups of vibration data 246 into number of associative memories 238. Number of associative memories 238 may ingest groups of vibration data 246 and form relationships between groups of vibration data 246 and groups of baseline data 236. Number of associative memories 238 may store groups of vibration data 246 for future use. For example, in some cases, groups of vibration data 246 may be used to predict a future status for health 204 of system 206.

In some illustrative examples, groups of vibration data 246 may be the same groups of baseline data 236. In other words, health analyzer 210 may place the data identified from images 218 into one of groups of baseline data 236 to further train health analyzer 210 using images 218. In this manner, health analyzer 210 may be configured to learn and adapt in performing the identification of status 226 for health 204 of system 206 as new vibration data is received over time.

Additionally, health analyzer 210 may be configured to display an indication of status 226 for health 204 of system 206 in graphical user interface 258 displayed on display system 260. Display system 260 may comprise a number of display devices, such as, for example, without limitation, at least one of a computer screen, a monitor, a liquid crystal display (LCD), a touch screen, or some other suitable type of display device.

As one illustrative example, an operator may view status 226 for health 204 of system 206 identified using image 248 in graphical user interface 258. Health analyzer 210 also may be configured to display other information in graphical user interface 258. For example, health analyzer 210 may display information retrieved from groups of baseline data 236 that is related to status 226 for health 204 of system 206 identified using image 248.

In one illustrative example, health analyzer 210 may place the data identified from image 248 into third group 254. This data may be an input into number of associative memories 238. In response to this input, number of associative memories 238 may return a set of operations identified in third baseline group 244 corresponding to third group 254 to health analyzer 210.

The set of operations may include operations that may need to be performed based on third status 234 corresponding to third baseline group 244. For example, the set of operations may include a maintenance operation, a test, an inspection, a part replacement, a rework operation, the generation of a work order, and/or other suitable types of operations.

Health analyzer 210 may display an indication that third status 234 has been identified for image 248 as well as the set of operations that may need to be performed for system 206 based on third status 234 for health 204 of system 206. The operator may view the information displayed in graphical user interface 258 and may enter user input 262 using user input device 264 configured to interact with graphical user interface 258.

User input 262 may identify additional information that may be placed into number of associative memories 238. For example, user input 262 may identify additional operations, new part numbers, work orders, and/or other suitable information. Health analyzer 210 may use the information provided in user input 262 to update groups of baseline data 236 stored in number of associative memories 238. In some cases, user input 262 may identify information for use in identifying status 226 for health 204 of system 206 from image 248.

Figure 3:
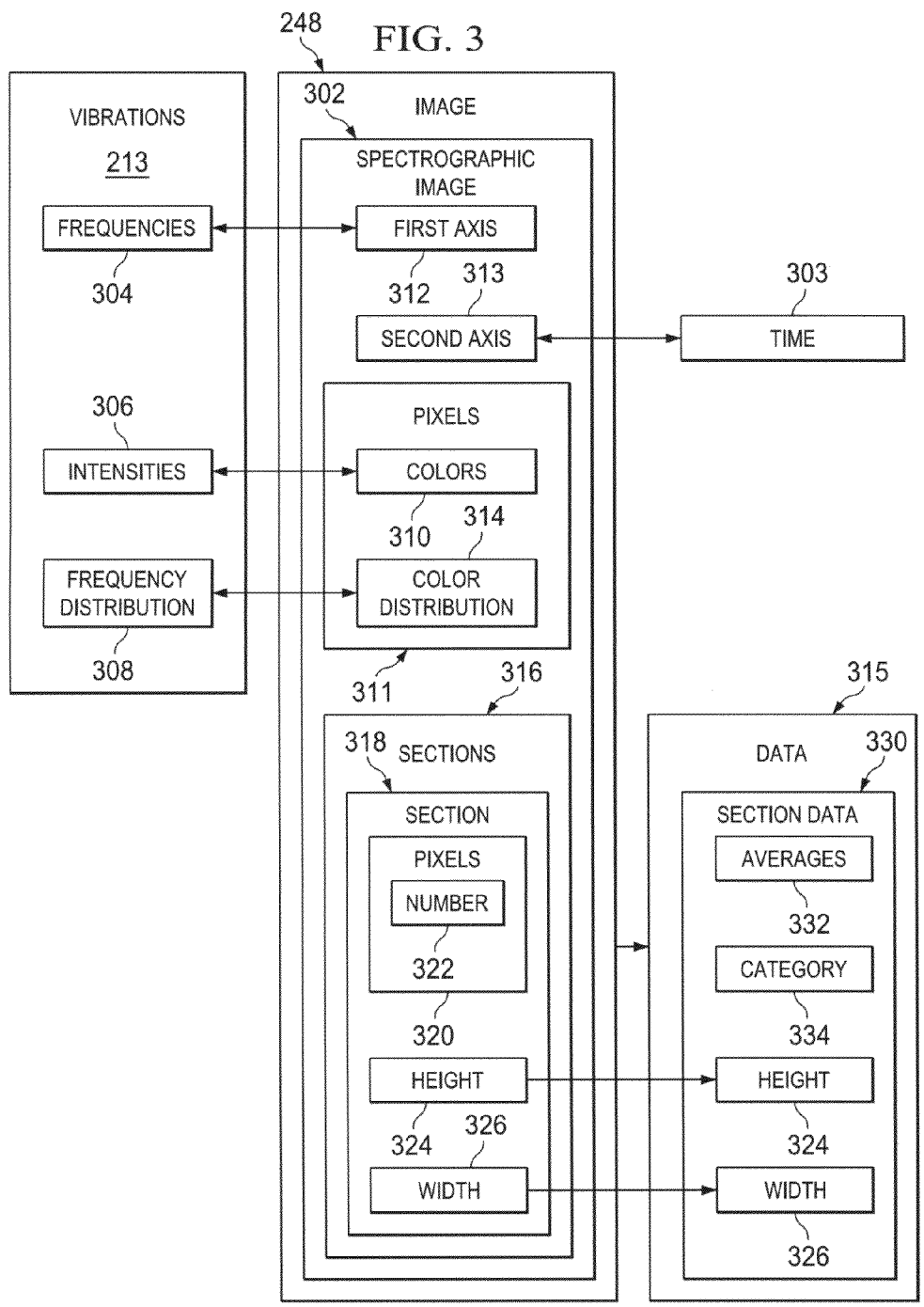
FIG. 3 is an illustration of an image generated by a spectrograph system in accordance with an advantageous embodiment.

With reference now to FIG. 3, an illustration of an image generated by a spectrograph system is depicted in accordance with an advantageous embodiment. In this illustrative example, image 248 from FIG. 2 is described in greater detail. In this illustrative example, image 248 takes the form of spectrographic image 302, which may be an example of one of spectrographic images 220 in FIG. 2.

As depicted, spectrographic image 302 represents the data for vibrations 213 of system 206 in FIG. 2. In particular, spectrographic image 302 represents frequencies 304, intensities 306, and frequency distribution 308 for vibrations 213 of system 206 as measured by spectrograph system 214 in FIG. 2. More specifically, spectrographic image 302 represents frequencies 304, intensities 306, and frequency distribution 308 using colors 310 and color distribution 314 for pixels 311 in spectrographic image 302.

In these illustrative examples, a frequency in frequencies 304 may be a number of oscillations for vibrations 213 per unit of time 303 as measured by sensor system 208 in FIG. 2. A particular intensity in intensities 306 may be a measure of the amplitude of the oscillations for vibrations 213. Frequency distribution 308 may indicate the number of occurrences for sets of frequencies for vibrations 213 over time 303.

Spectrographic image 302 may have first axis 312 and second axis 313. In some illustrative examples, first axis 312 may be a horizontal axis and second axis 313 may be a vertical axis. First axis 312 may be for frequencies 304, and second axis 313 may be for time 303.

Further, the different values for colors 310 in spectrographic image 302 may represent the different values for intensities 306. Color distribution 314 of colors 310 in spectrographic image 302 may represent frequency distribution 308 for frequencies 304.

In these illustrative examples, health analyzer 210 in FIG. 2 may be configured to analyze spectrographic image 302 and identify data 315 from spectrographic image 302. For example, health analyzer 210 in FIG. 2 may be configured to analyze spectrographic image 302 by dividing spectrographic image 302 into sections 316. In one illustrative example, sections 316 may be substantially equally sized and substantially equally shaped. Sections 316 may also be referred to as sub-images.

Health analyzer 210 may be configured to analyze sections 316 to identify data 315 and store data 315 in number of associative memories 238 in FIG. 2. For example, section 318 may be an example of one of sections 316. In one illustrative example, section 318 may comprise pixels 320. Number 322 of pixels 320 in section 318 may be computed based on height 324 and width 326 of section 318 in terms of pixels. For example, if section 318 has height 324 of four pixels, and width 326 of 25 pixels, number 322 of pixels 320 may be 100 pixels.

In these illustrative examples, health analyzer 210 may identify section data 330 for section 318. Section data 330 may be identified for each of sections 316 in data 315. Section data 330 may include averages 332 and category 334.

Health analyzer 210 may identify the sum of the values for each of the colors for pixels 320 in section 318 and divide these sums by number 322 to generate averages 332. The color for each pixel in pixels 320 may be some combination of a red color, a green color, and a blue color. Each pixel may have a value for the red color, a value for the green color, and a value for the blue color that identifies the brightness of each of these colors in the pixel. These values may range from zero to 255, although other values may be used in different advantageous embodiments.

In this manner, health analyzer 210 identifies averages for the values for the red colors, the averages for the values for the green colors, and the averages for the values for the blue colors for pixels 320 to form averages 332. Section data 330 may be identified for each of sections 316 in data 315.

Further, health analyzer 210 may also identify category 334 for section 318 based on averages 332 in section data 330. Category 334, in this illustrative example, may be one of red, yellow, green, and blue. In other words, category 334 may be an overall color identified for section 318. Additionally, in some cases, health analyzer 210 may include height 324 and width 326 of section 318 in section data 330.

Section data 330 for each of sections 316 may be used to identify status 226 for health 204 of system 206 in FIG. 2 from spectrographic image 302. For example, section data 330 may be compared to baseline data stored in number of associative memories 238 in FIG. 2 to identify status 226.

In these illustrative examples, health analyzer 210 stores section data 330 for each of sections 316 as data 315 in number of associative memories 238 in FIG. 2. Further, health analyzer 210 places data 315 for spectrographic image 302 into one of groups of vibration data 246 based on averages 332, category 334, the training of health analyzer 210, and/or other suitable information. In particular, status 226 for health 204 of system 206 may be identified using data 315 for spectrographic image 302 and used to place data 315 into one of groups of vibration data 246 in FIG. 2.

In some illustrative examples, health analyzer 210 may identify status 226 for health 204 of system 206 for each of sections 316. In this manner, health analyzer 210 may associate section 318 with one of first status 230, second status 232, and third status 234 for health 204 of system 206 in FIG. 2. Health analyzer 210 may store the particular status identified for section 318 in number of associative memories 238.

Depending on the implementation, health analyzer 210 may use the information stored in number of associative memories 238 for particular sections of sections 316 in spectrographic image 302 to predict status 226 for health 204 of system 206 in other sections of sections 316. Further, this information may be used to predict status 226 for health 204 of system 206 with respect to sections in other spectrographic images in spectrographic images 220 in FIG. 2.

The illustrations of health management environment 200 in FIG. 2 and spectrographic image 302 in FIG. 3 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, status 226 may include more categories than first status 230, second status 232, and third status 234. Further, in other illustrative examples, groups of baseline data 236 and/or groups of vibration data 246 may include more than three groups.

In other illustrative examples, sensor system 208 may be configured to send vibration data 212 to health analyzer 210. Health analyzer 210 may be configured to represent vibration data 212 in spectrographic images 220.

In some cases, number of associative memories 238 may not be located in computer system 222. For example, number of associative memories 238 may be stored in a location remote to computer system 222. In some illustrative examples, sections 316 may not be substantially equally spaced and/or shaped. For example, sections 316 may have different shapes and/or sizes.

Figure 4:
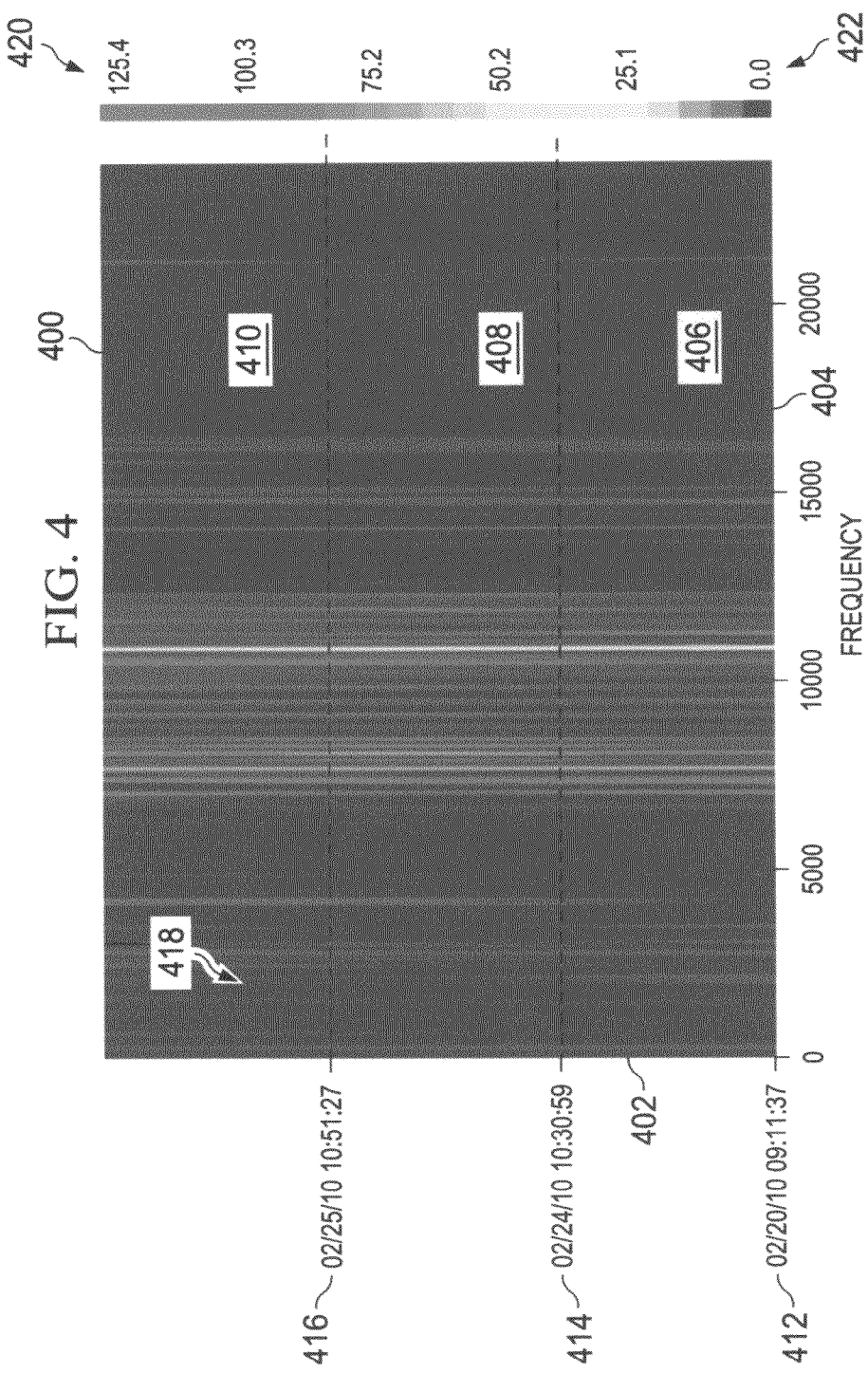
FIG. 4 is an illustration of a spectrographic image in accordance with an advantageous embodiment.

With reference now to FIG. 4, an illustration of a spectrographic image is depicted in accordance with an advantageous embodiment. In this illustrative example, spectrographic image 400 is an example of one example of spectrographic image 302 in FIG. 3. Spectrographic image 400 may be generated for a system, such as system 206 in FIG. 2, by, for example, spectrograph system 214 in FIG. 2.

As depicted, spectrographic image 400 presents data for vibrations of a system with respect to time and frequency. In particular, vertical axis 402 is time, and horizontal axis 404 is frequency. As depicted, the time indicated by vertical axis 402 may include the date and time at which the vibration data was generated for the system.

For example, spectrographic image 400 may include strip 406, strip 408, and strip 410. These strips may represent different portions of vibration data generated at different times that have been combined to form spectrographic image 400.

Strip 406 may represent vibration data generated between time 412 and a selected period of time after time 412. As depicted, time 412 may include both a date and time. The selected period of time may be, for example, 30 minutes. As one illustrative example, an operator may manipulate a control on the spectrograph system, such as a button, that causes the vibration data in strip 406 to begin being generated at time 412. This vibration data may then be measured continuously until the selected period of time elapses.

In a similar manner, strip 408 may represent vibration data generated between time 414 and the selected period of time. As depicted, time 414 may indicate a date and time that is approximately four days after time 412. Strip 410 may represent vibration data generated between time 416 and the selected period of time. Time 416 may indicate a date and time that is approximately one day after time 414.

In some illustrative examples, the vibration data generated at time 412, time 414, and time 416 may be carried in electrical signals and stored in either the time domain or the frequency domain. When the vibration data is in or has been converted to the frequency domain, the spectrograph system may generate spectrographic image 400 with the vibration data represented with respect to time.

In this illustrative example, colors 418 represent the intensities of vibrations measured. Legend 420 indicates that colors 418 correspond to vibration intensities 422. Vibration intensities 422 may be in g-force (g) units.

The color distribution of colors 418 in spectrographic image 400 may indicate a status for the health of the system. In this illustrative example, health analyzer 210 from FIG. 2 may identify the status for the health of the system as "preferred" based on spectrographic image 400.

Figure 5:
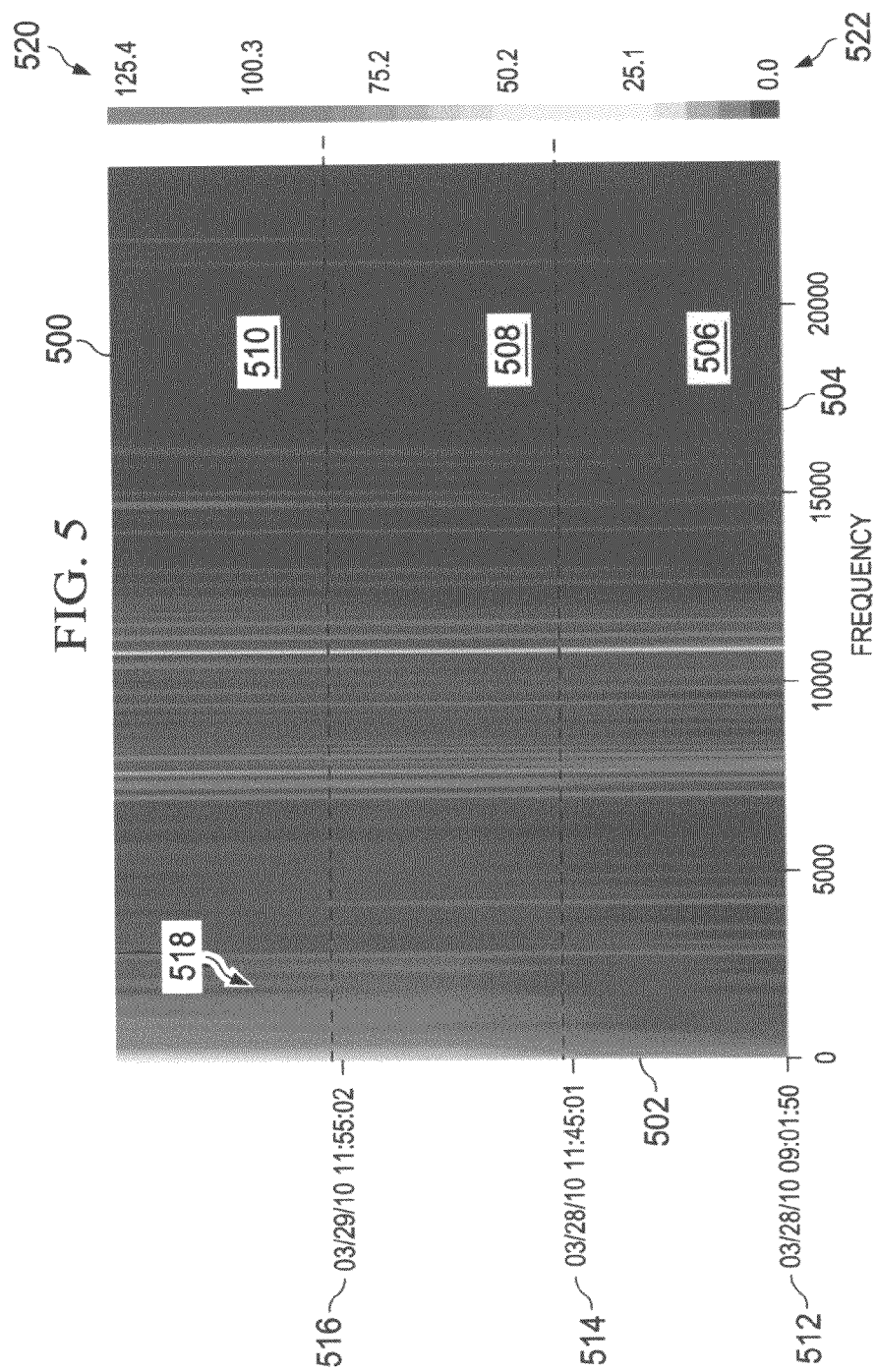
FIG. 5 is an illustration of another spectrographic image in accordance with an advantageous embodiment.

Turning now to FIG. 5, an illustration of another spectrographic image is depicted in accordance with an advantageous embodiment. In this illustrative example, spectrographic image 500 is an example of one implementation for spectrographic image 302 in FIG. 3. Spectrographic image 500 may be generated for a system, such as system 206 in FIG. 2, by, for example, spectrograph system 214 in FIG. 2.

In this depicted example, spectrographic image 500 may be generated for the same system for which spectrographic image 400 was generated. Further, spectrographic image 500 may be generated based on vibration data collected for the system at a later point in time than the vibration data represented in spectrographic image 400. In particular, the vibration data represented in spectrographic image 500 may have been generated about one month after the vibration data represented in spectrographic image 400.

As depicted, spectrographic image 500 presents data for vibrations of a system with respect to time and frequency. In particular, vertical axis 502 is time, and horizontal axis 504 is frequency. The time indicated by vertical axis 502 may include the date and time at which the vibration data was generated for the system.

For example, spectrographic image 500 may include strip 506, strip 508, and strip 510. These strips may represent different portions of vibration data generated at different times that have been combined to form spectrographic image 500. These strips may be generated to form spectrographic image 500 in a manner similar to the manner in which spectrographic image 400 was formed.

Strip 506 may represent vibration data generated between time 512 and a selected period of time after time 512. The selected period of time may be, for example, 30 minutes. Strip 508 may represent vibration data generated between time 514 and the selected period of time. Strip 510 may represent vibration data generated between time 516 and the selected period of time. As depicted, each of times 512, 514, and 516 indicate both a date and time.

In this illustrative example, colors 518 represent the intensities of the vibrations measured. Legend 520 indicates that colors 518 correspond to vibration intensities 522. Vibration intensities 522 may be in g-force (g) units.

The color distribution of colors 518 in spectrographic image 500 may indicate a status for the health of the system. In this illustrative example, health analyzer 210 from FIG. 2 may identify a status for the health of the system as "non-preferred" based on spectrographic image 500.

Figure 6:
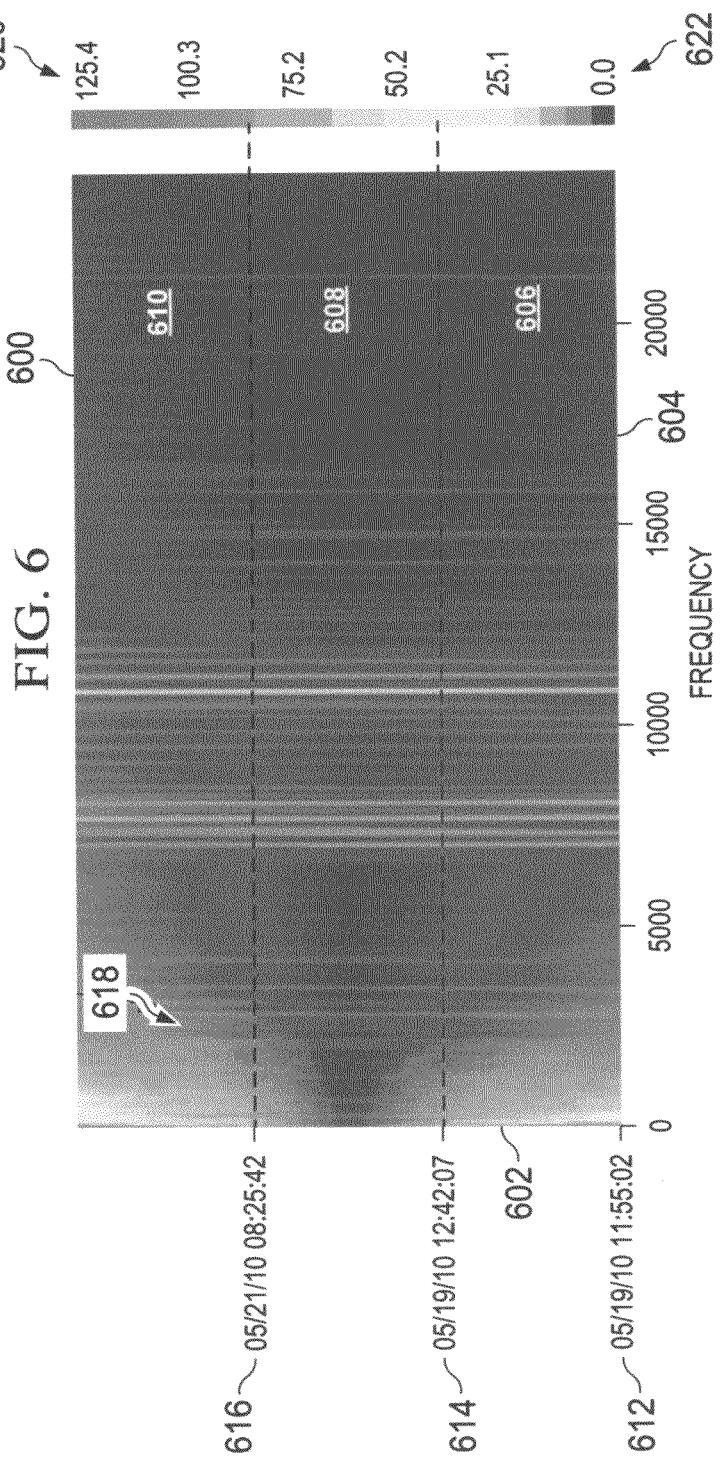
FIG. 6 is an illustration of a spectrographic image in accordance with an advantageous embodiment.

With reference now to FIG. 6, an illustration of a spectrographic image is depicted in accordance with an advantageous embodiment. In this illustrative example, spectrographic image 600 is an example of one implementation for spectrographic image 302 in FIG. 3. Spectrographic image 600 may be generated for a system, such as system 206 in FIG. 2, by, for example, spectrograph system 214 in FIG. 2.

In this depicted example, spectrographic image 600 may be generated for the same system for which spectrographic image 400 and spectrographic image 500 were generated. Further, spectrographic image 600 may be generated based on vibration data collected for the system at a later point in time than the vibration data represented in spectrographic image 400 and the vibration data represented in spectrographic image 500. In particular, the vibration data represented in spectrographic image 600 may have been generated about two months after the vibration data represented in spectrographic image 500.

As depicted, spectrographic image 600 presents data for vibrations of a system with respect to time and frequency. In particular, vertical axis 602 is time, and horizontal axis 604 is frequency. The time indicated by vertical axis 602 may include the date and time at which the vibration data was generated for the system.

For example, spectrographic image 600 may include strip 606, strip 608, and strip 610. These strips may represent different portions of vibration data generated at different times that have been combined to form spectrographic image 600. These strips may be generated to form spectrographic image 600 in a manner similar to the manner in which spectrographic image 400 was formed.

Strip 606 may represent vibration data generated between time 612 and a selected period of time after time 612. The selected period of time may be, for example, 30 minutes. Strip 608 may represent vibration data generated between time 614 and the selected period of time. Strip 610 may represent vibration data generated between time 616 and the selected period of time. As depicted, each of times 612, 614, and 616 indicate both a date and time.

In this illustrative example, colors 618 represent the intensities of the vibrations measured. Legend 620 indicates that colors 618 correspond to vibration intensities 622. Vibration intensities 622 may be in g-force (g) units.

The color distribution of colors 618 in spectrographic image 600 may indicate a status for the health of the system. In this illustrative example, health analyzer 210 from FIG. 2 may identify a status for the health of the system as "maintenance" based on spectrographic image 600.

In this manner, spectrographic image 400 from FIG. 4, spectrographic image 500 from FIG. 5, and spectrographic image 600 from FIG. 6 show how the health of a system, such as system 206 in FIG. 2, may weaken over time. These different spectrographic images may be ingested into, for example, number of associative memories 238 in FIG. 2, for future use in identifying the status of the health of the system. In particular, these spectrographic images may be integrated with baseline data in the associative memories.

With reference now to FIG. 7, an illustration of a flowchart of a process for determining the health of a system is depicted in accordance with an advantageous embodiment. The process illustrated in FIG. 7 may be implemented using health analyzer 210 in health monitoring system 202 in FIG. 2.

Further, the process illustrated in FIG. 7 may be implemented using one or more processors, possibly in a networked or distributed environment, such as, but not limited to, processor unit 904 of FIG. 9. As used herein, the term "health analyzer" is not limited to health analyzer 210 in FIG. 2 but may also include any processor or set of processors used together with a computer readable medium in order to effectuate the operations described herein. The process illustrated in FIG. 7 may be implemented using software, hardware, or a combination thereof, but, in particular, may be used in conjunction with an associative memory.

The process may begin with the health analyzer identifying groups of vibration data for the system (operation 700). A group of vibration data in the groups of vibration data may comprise data for vibrations of the system at different frequencies over time. The data for the vibrations of the system may be generated using a sensor system. The sensor system may be, for example, a spectrograph system.

The health analyzer may then store the groups of vibration data for the system in a number of associative memories in a computer system (operation 702). Thereafter, the health analyzer may identify the health of the system based on the groups of vibration data in the number of associative memories (operation 704), with the process terminating thereafter.

With reference now to FIG. 8, an illustration of a flowchart of a process for determining the health of a system is depicted in accordance with an advantageous embodiment. The process illustrated in FIG. 8 may be implemented using health analyzer 210 in health monitoring system 202 in FIG. 2. This process may be a more-detailed process for the process described in FIG. 7.

Further, the process illustrated in FIG. 8 may be implemented using one or more processors, possibly in a networked or distributed environment, such as, but not limited to, processor unit 904 of FIG. 9. As used herein, the term "health analyzer" is not limited to health analyzer 210 in FIG. 2 but may also include any processor or set of processors used together with a computer readable medium in order to effectuate the operations described herein. The process illustrated in FIG. 8 may be implemented using software, hardware, or a combination thereof, but, in particular, may be used in conjunction with an associative memory.

The process may begin with the health analyzer receiving spectrographic images (operation 800). These spectrographic images may represent data for the vibration of a system measured by the number of vibration sensors during testing of the system. The spectrographic images may represent, for example, vibration frequencies, vibration intensities, and vibration frequency distribution.

The health analyzer may then select an unprocessed spectrographic image for processing (operation 802). The health analyzer may divide the selected spectrographic image into sections (operation 804). Then, the health analyzer may identify section data for each of the sections of the spectrographic images to form data for the spectrographic image (operation 806). This section data may be, for example, section data 330 in FIG. 3.

Thereafter, the health analyzer may identify the status for the health of the system based on the data for the spectrographic image (operation 808). Next, the health analyzer may place the data for the spectrographic image into one of groups of vibration data corresponding to the status identified for the health of the system (operation 810).

Next, the health analyzer may determine whether any additional unprocessed spectrographic images are present (operation 812). If additional unprocessed spectrographic images are not present, the process may terminate. Otherwise, the process may return to operation 802 as described above.

Turning now to FIG. 9, an illustration of a data processing system is depicted in accordance with an advantageous embodiment. In this illustrative example, data processing system 900 may be used to implement one or more computers in computer system 222 in FIG. 2. Data processing system 900 includes communications fabric 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908.

Computer readable storage media 924 also may take the form of a persistent storage, such as a hard drive, a thumb drive, or a flash memory, that is connected to data processing system 900. In some instances, computer readable storage media 924 may not be removable from data processing system 900. In these examples, computer readable storage media 924 is a physical or tangible storage device used to store program code 918 rather than a medium that propagates or transmits program code. 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different advantageous embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 906, or a cache, such as found in an interface and memory controller hub that may be present in communications fabric 902.

Thus, the different advantageous embodiments provide a method and apparatus for determining the health of a system. In one advantageous embodiment, groups of vibration data are identified for the system. A group of vibration data in the groups of vibration data comprises data for vibrations for the system at different frequencies over time. The groups of vibration data for the system are stored in a number of associative memories in a computer system. The health of the system is identified based on the groups of vibration data in the number of associative memories. In this manner, the different advantageous embodiments provide a health monitoring system that may allow the health of a system to be determined more accurately and efficiently as compared to currently available health monitoring systems.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for determining a health of a system comprising:
identifying groups of vibration data for the system, wherein a group of vibration data in the groups of vibration data comprises data for vibrations of the system at different frequencies over time, and wherein the groups of vibration data comprise images of the vibrations of the system;
storing the groups of vibration data for the system in a number of associative memories in a computer system, wherein the number of associative memories each comprise a type of memory having an organization in which data stored in a corresponding associative memory may be accessed based on both direct and indirect relationships among different data stored in the corresponding associative memory, wherein each of the number of associative memories comprise both the data and associations between the data, and wherein each of the number of associative memories also comprise a corresponding content-addressable structure that is configured to map a set of input patterns to a set of output patterns; and identifying the health of the system based on the groups of vibration data in the number of associative memories.

2. The method of claim 1 further comprising:

generating the groups of vibration data for the system using a sensor system.

3. The method of claim 2, wherein the sensor system comprises a number of vibration sensors.

4. The method of claim 1, wherein identifying the health of the system based on the groups of vibration data in the number of associative memories comprises:

identifying the health of the system based on the groups of vibration data in the number of associative memories using an artificial intelligence system.

5. The method of claim 4, wherein the artificial intelligence system is selected from at least one of a cognitive simulation, a knowledge-based system, a neural network, a fuzzy logic system, and a cognitive model.

6. The method of claim 1, wherein an image in the images represents the data for the vibrations using frequency, intensity, and frequency distribution.

7. The method of claim 1, further comprising:

dividing each image in the images into sections.

8. The method of claim 1, wherein identifying the health of the system based on the groups of vibration data in the number of associative memories is performed using a health analyzer and further comprising:

placing a number of groups of baseline vibration data into the number of associative memories; and training the health analyzer using the number of groups of baseline vibration data.

9. The method of claim 1, wherein the system is an assembly of components.

10. A method for determining a health of a system, the method comprising:

storing spectrographic images of vibrations of the system in a number of associative memories in a computer system; and identifying the health of the system based on the spectrographic images stored in the number of associative memories.

11. The method of claim 10, wherein identifying the health of the system based on the spectrographic images stored in the number of associative memories comprises:

identifying the health of the system based on groups of vibration data in the number of associative memories using an artificial intelligence system.

12. A computer health monitoring system comprising:

a number of associative memories configured by the computer to store groups of vibration data for a system, wherein the number of associative memories each comprise a type of memory having an organization in which data stored in a corresponding associative memory may be accessed based on both direct and indirect relationships among different data stored in the corresponding associative memory, wherein each of the number of associative memories comprise both the data and associations between the data, and wherein each of the number of associative memories also comprise a corresponding content-addressable structure that is configured to map a set of input patterns to a set of output patterns, and wherein a group of vibration data in the groups of vibration data comprises data for vibrations of the system at different frequencies over time, and wherein the groups of vibration data comprise images of the vibrations of the system; and a health analyzer, comprising a processor connected to the number of associative memories, configured to identify a health of the system based on the groups of vibration data in the number of associative memories.

13. The computer health monitoring system of claim 12 further comprising:

a sensor system configured to generate the groups of vibration data for the system.

14. The computer health monitoring system of claim 13, wherein the sensor system comprises a number of vibration sensors.

15. The computer health monitoring system of claim 12, wherein the health analyzer comprises an artificial intelligence system selected from at least one of a cognitive simulation, a knowledge-based system, a neural network, a fuzzy logic system, and a cognitive model.

16. The computer health monitoring system of claim 12, wherein an image in the images represents the data for the vibrations using frequency, intensity, and frequency distribution.

17. The computer health monitoring system of claim 12, wherein the health analyzer is configured to place a number of groups of baseline vibration data into the number of associative memories; and train the health analyzer using the number of groups of baseline vibration data.

18. The computer health monitoring system of claim 12, wherein the system is selected from one of an aircraft, a gearbox, an engine, an engine housing, a control surface, a landing gear system, a fuselage, a spacecraft, a wind turbine, a dam, a computer numerical controlled machine, a building, and a bridge.

* * * * *